(12) United States Patent
Eppe

(10) Patent No.: US 12,782,540 B2
(45) Date of Patent: Nov. 3, 2026

(54) METHOD FOR MEASURING THE DISTANCE BETWEEN TWO POINTS IN SPACE AND TELEMETRY SYSTEM FOR IMPLEMENTING SUCH A METHOD

(71) Applicant: EPPE SOFTWARE, Bischheim (FR)

(72) Inventor: Alexandre Eppe, Bischheim (FR)

(73) Assignee: EPPE SOFTWARE, Bischheim (FR)

( * ) Notice: Subject to any disclaimer, the term of this patent is extended or adjusted under 35 U.S.C. 154(b) by 180 days.

(21) Appl. No.: 18/864,215

(22) PCT Filed: May 11, 2023

(86) PCT No.: PCT/EP2023/062593
§ 371 (c)(1),
(2) Date: Nov. 8, 2024

(87) PCT Pub. No.: WO2023/217956
PCT Pub. Date: Nov. 16, 2023

(65) Prior Publication Data

US 2026/0251771 A1 Aug. 27, 2026

(30) Foreign Application Priority Data

May 11, 2022 (FR) ....................................... 2204477

(51) Int. Cl.
*G01S 13/46* (2006.01)
*G01S 13/02* (2006.01)
*G01S 13/87* (2006.01)

(52) U.S. Cl.
CPC .......... *G01S 13/46* (2013.01); *G01S 13/0209* (2013.01); *G01S 13/876* (2013.01)

(58) Field of Classification Search
CPC ..... G01S 13/46; G01S 13/0209; G01S 13/876
See application file for complete search history.

(56) References Cited

U.S. PATENT DOCUMENTS

| | | | | |
|---|---|---|---|---|
| 6,414,745 | B1 * | 7/2002 | Moriya | G01S 13/46 342/126 |
| 9,213,083 | B1 * | 12/2015 | Carter | G01S 5/10 |
| 2004/0051860 | A1 | 3/2004 | Honda et al. | |
| 2011/0279366 | A1 | 11/2011 | Lohbihler | |
| 2016/0341546 | A1 * | 11/2016 | An | G01B 11/14 |
| 2022/0358311 | A1 * | 11/2022 | Maeda | G06V 10/811 |
| 2023/0400549 | A1 * | 12/2023 | Duan | G01S 13/56 |

FOREIGN PATENT DOCUMENTS

| | | | |
|---|---|---|---|
| FR | 2988829 | A1 | 10/2013 |
| WO | 0161278 | A1 | 8/2001 |

* cited by examiner

*Primary Examiner* — Timothy A Brainard
(74) *Attorney, Agent, or Firm* — Craft Chu PLLC; Andrew W. Chu

(57) ABSTRACT

The method for measuring the distance between a first point in space and a second point in space includes the following steps: a) providing a spatial reference device including a first reference point and a telemetry device; b) positioning the spatial reference device in space; c) determining the relative position between the first reference point and the first point; d) determining the relative position between the first reference point and the second point; e) calculating the distance between the first point and the second point from the relative position between the reference point and the first point and the relative position between the reference point and the second point.

11 Claims, 3 Drawing Sheets

[Fig. 1]
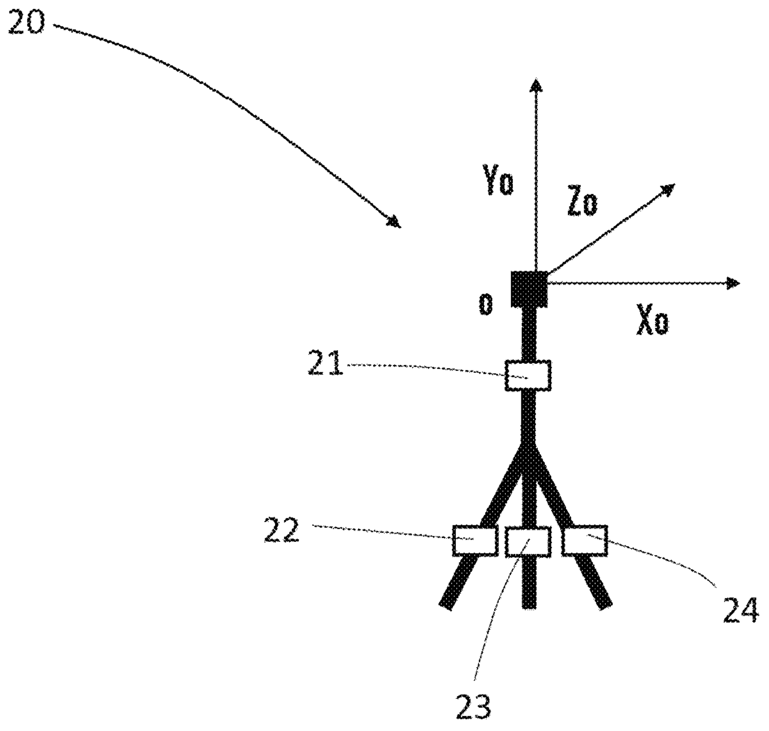
[Fig. 2]
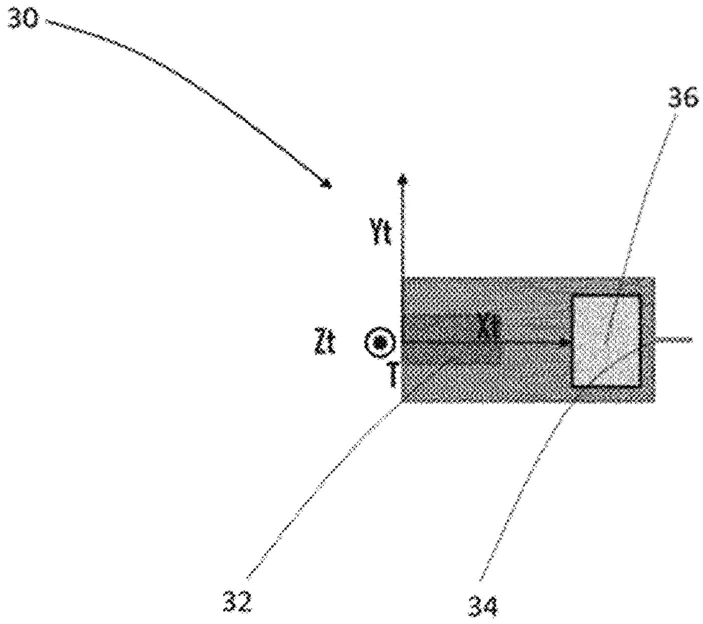

[Fig. 3]
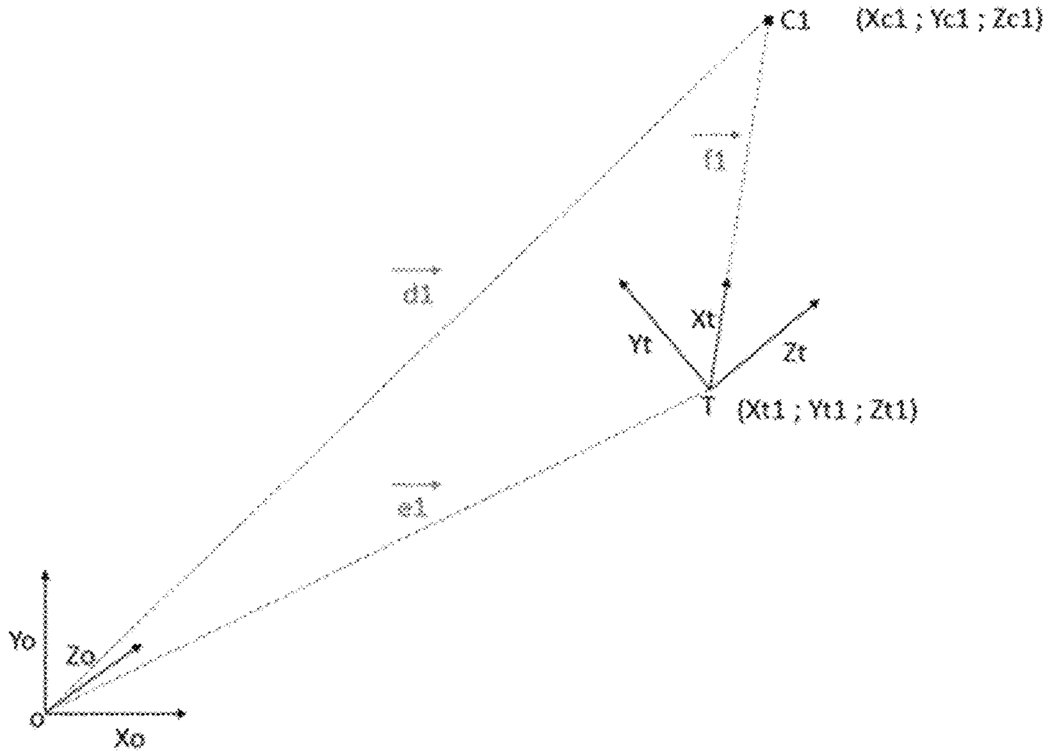
[Fig. 4]
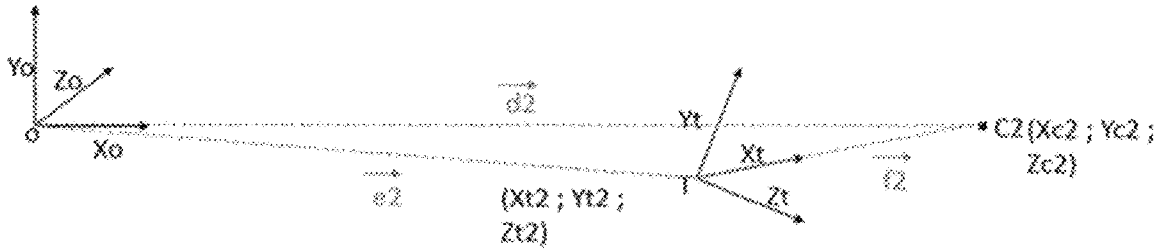

[Fig. 5]
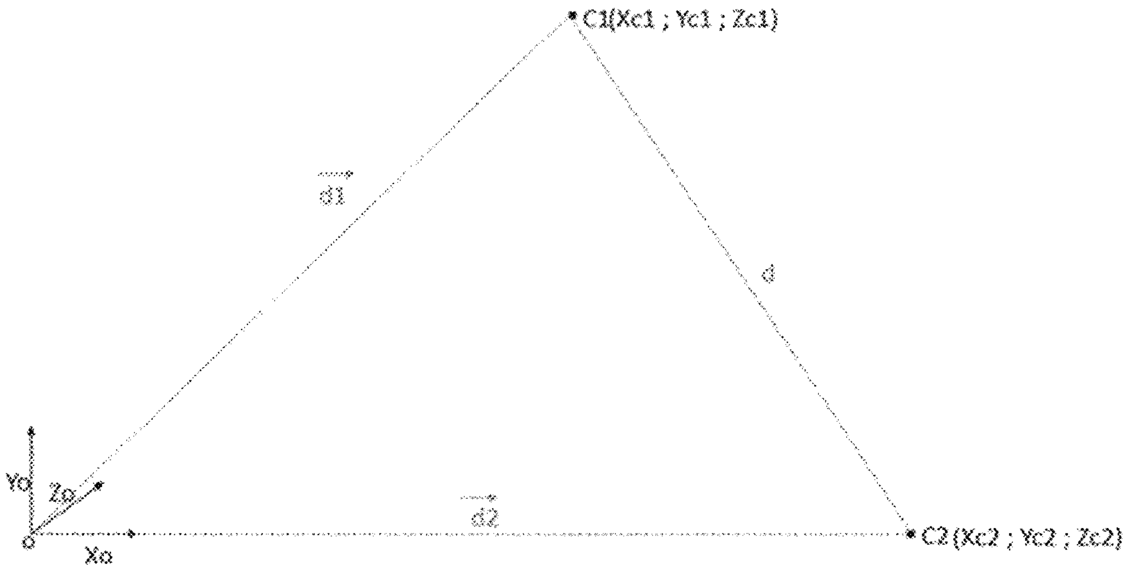

METHOD FOR MEASURING THE DISTANCE BETWEEN TWO POINTS IN SPACE AND TELEMETRY SYSTEM FOR IMPLEMENTING SUCH A METHOD

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a method for measuring the distance between two points in space and a telemetry system for implementing such a method.

2. Description of Related Art Including Information Disclosed Under 37 CFR 1.97 and 37 CFR 1.98

In a known manner, a method for measuring the distance between two points using a telemetry means comprising a telemeter is generally implemented, by placing a reference point present on a housing of the telemetry means in juxtaposition with one of the two points and pointing the telemeter at the other of the two points, for example using a laser beam. Assuming a fixed distance between the reference point and the telemeter, the distance between the point juxtaposed with the reference point and the telemeter point can be calculated.

This method for measuring the distance between two points is disadvantageous when the two points for which the relative distance is to be determined are difficult to access, because they are located high up below the floor of a room for example and/or because of an obstacle preventing juxtaposition of the reference point of the telemetry means and/or preventing plotting of the other of the two points by the telemeter.

Document FR 2 988 829 A1 discloses a telemetry method implemented by a telemetry means provided with two telemeters in the form of a laser beam emitting means. The telemetry means determines an angle between the laser beam emitted by each of the telemeters. In order to determine a distance between two points using this telemetry means, the first of the telemeters is aligned with a first of these two points and the second of the telemeters is aligned with a second of these two points. Next, the distance between the telemetry means and each of the two points and the angle formed between the two laser beams is measured. Using the distance between the telemetry means and each of the points and the angle formed between the two laser beams, the distance between the two points can be calculated.

This method is difficult to implement, particularly for a user with little telemetry experience, since the method requires that the two points, for which the relative distance is to be determined, are each simultaneously pointed at with their own laser beam.

BRIEF SUMMARY OF THE INVENTION

It is an object of the present application to propose a method for measuring the distance between two points in space which is easy to implement by a user.

To this end, the present invention relates to a method for measuring the distance between a first point in space and a second point in space, comprising the following steps:

- a) providing a spatial reference device comprising a first reference point and at least two referential radio transceivers, that is, a first referential radio transceiver and a second referential radio transceiver, and a telemetry means provided with a second reference point, at least one positioning radio transceiver and at least one telemeter;
- b) positioning the spatial reference device in space;
- c) determining the relative position between the first reference point and the first point
  - i. by positioning the telemetry means in space,
  - ii. by determining the distance between the second reference point of the telemetry means and the first point using the telemeter,
  - iii. by determining the relative position between the first reference point of the spatial reference device and the second reference point of the telemetry means from at least one radio signal transmitted between the referential radio transceivers and the positioning radio transceiver,
  - iv. by determining the orientation of the telemetry means in space,
  - v. by calculating the relative position between the second reference point and the first point from the distance between the second reference point and the first point, the relative position between the spatial reference device and the second reference point and the orientation of the telemetry means in space,
- d) determining the relative position between the first reference point and the second point
  - i. by positioning the telemetry means in space,
  - ii. by determining the distance between the second reference point of the telemetry means and the second point using the telemeter,
  - iii. by determining the relative position between the first reference point of the spatial reference device and the second reference point of the telemetry means from at least one radio signal transmitted between the referential radio transceivers and the positioning radio transceiver,
  - iv. by determining the orientation of the telemetry means in space, v. by calculating the relative position between the second reference point and the second point from the distance between the second reference point and the second point, the relative position between the spatial reference device and the second reference point and the orientation of the telemetry means in space, e) calculating the distance between the first point and the second point from the relative position between the reference point and the first point and the relative position between the reference point and the second point.

The distance measuring method according to the invention allows a measurement to be taken between the two points in space by successively pointing at each of the two points using the telemeter. The method according to the invention makes it easy to measure a distance between two points, even if these points are difficult to access, such as points located high up under a ceiling or a roof or located in an unsecured building.

Preferably, following positioning in space of the spatial reference device, the spatial reference device is maintained in the same position during at least steps c) and d).

According to a possible additional feature, the telemetry means is provided with a gyroscope and the method is characterized in that, in steps c) .iv and d) .iv, the orientation of the telemetry means in space is determined using the gyroscope.

According to one possibility, in steps c) .iii and d) .iii, the relative position between the first reference point and the second reference point is calculated:

by transmitting, from the positioning radio transceiver, a first radio request signal to the first referential transceiver and a second radio request signal to the second referential transceiver, by transmitting, from the first referential transceiver, a first radio response signal to the positioning radio transceiver after reception of the first radio request signal, and by transmitting, from the second referential transceiver, a second radio response signal to the positioning radio transceiver after reception of the second radio request signal, by receiving the first radio response signal and the second radio response signal at the positioning radio transceiver, by determining a first response time elapsed between transmission of the first radio request signal and reception of the first radio response signal at the positioning radio transceiver, by determining a second response time elapsed between transmission of the second radio request signal and reception of the second radio response signal at the positioning radio transceiver, by determining a first angle between the first radio response signal in connection with the positioning radio transceiver and the second radio response signal in connection with the positioning radio transceiver, and by calculating the relative position between the first reference point and the second reference point from the first response time, the second response time and the first angle.

In accordance with a preferential alternative, the spatial reference device further comprises a third referential radio transceiver, the method characterized in that, in steps c) .iii and d) .iii, the relative position between the first reference point and the second reference point is calculated:

by transmitting, from the positioning radio transceiver, a first radio request signal to the first referential transceiver, a second radio request signal to the second referential transceiver and a third radio request signal to the third referential transceiver, by transmitting, from the first referential transceiver, a first radio response signal to the positioning radio transceiver after reception of the first radio request signal, by transmitting, from the second referential transceiver, a second radio response signal to the positioning radio transceiver after reception of the second radio request signal and by transmitting, from the third referential transceiver, a third radio response signal to the positioning radio transceiver after reception of the third radio request signal, by receiving the first radio response signal, the second radio response signal and the third radio response signal at the positioning radio transceiver, by determining a first response time elapsed between transmission of the first radio request signal and reception of the first radio response signal at the positioning radio transceiver, by determining a second response time elapsed between transmission of the second radio request signal and reception of the second radio response signal at the positioning radio transceiver, by determining a third response time elapsed between transmission of the third radio request signal and reception of the third radio response signal at the positioning radio transceiver, and by calculating the relative position between the first reference point and the second reference point from the first response time, the second response time and the third response time.

According to a possible additional feature, the spatial reference device further comprises a third referential radio transceiver, the first referential radio transceiver, the second referential radio transceiver, the third referential radio transceiver and the positioning radio transceiver each having a clock, the method characterized in that in steps c) .iii and d) .iii, the relative position between the first reference point and the second reference point is calculated:

by synchronizing each of the clocks of the referential radio transceivers and the positioning radio transceiver, by transmitting, from the positioning radio transceiver, a first radio request signal to the first referential transceiver, a second radio request signal to the second referential transceiver and a third radio request signal to the third referential transceiver, by receiving the first radio request signal at the first referential radio transceiver and by storing a first date of reception of the first radio request signal corresponding to the date indicated by the clock of the first referential radio transceiver at the time of reception of the first radio request signal by the first referential radio transceiver, by receiving the second radio request signal at the second referential radio transceiver and by storing a second date of reception of the second radio request signal corresponding to the date indicated by the clock of the second referential radio transceiver at the time of reception of the second radio request signal by the second referential radio transceiver, by receiving the third radio request signal at the third referential radio transceiver and by storing a third date of reception of the third radio request signal corresponding to the date indicated by the clock of the third referential radio transceiver at the time of reception of the third radio request signal by the third referential radio transceiver, and by calculating the relative position between the first reference point and the second reference point from the first date, the second date and the third date.

According to one possibility, the radio signal and/or the first radio request signal and/or the first radio response signal and/or the second radio request signal and/or the second radio response signal and/or the third radio request signal and/or the third radio response signal is/are an/are ultra-wideband signal(s). The objective of the invention is also a telemetry system for implementing the method according to the invention. The telemetry system comprises a spatial reference device comprising a first reference point and at least two referential radio transceivers, that is, a first referential radio transceiver and a second referential radio transceiver, and a telemetry means having a second reference point, at least one positioning radio transceiver and at least one telemeter.

The telemetry system according to the invention allows a measurement to be taken between two points in space by successively pointing at each of the two points using the telemeter. The telemetry system according to the invention makes it easy to measure a distance between two points, even if these points are difficult to access, such as points located high up under a ceiling or a roof or located in an unsecured building.

According to a possible additional feature, the telemetry means is provided with a gyroscope.

According to a preferential alternative of the invention, the spatial reference device further comprises a third referential radio transceiver.

Preferentially, the first referential radio transceiver, the second referential radio transceiver, the third referential radio transceiver and the positioning radio transceiver each have a clock.

According to one possibility, the first referential radio transceiver and/or the second referential radio transceiver and/or the third referential radio transceiver and/or the positioning radio transceiver is/are an ultra-wideband transceiver(s).

BRIEF DESCRIPTION OF THE SEVERAL VIEWS OF THE DRAWINGS

The invention will be better understood from the following description, which refers to a preferred embodiment, given as a non-limiting example, and explained with reference to the attached schematic drawings.

FIG. 1 is a schematic view of a representation of a spatial reference device of a telemetry system according to a preferential embodiment of the invention.

FIG. 2 is a schematic view of a view of a representation of a telemetry means of the telemetry system according to the preferential embodiment of the invention.

FIG. 3 is a schematic view of a representation of an alignment of the telemetry system according to the preferential embodiment of the invention when performing step c) of a method for measuring the distance between two points in accordance with the invention.

FIG. 4 is a schematic view of a representation of the alignment of the telemetry system according to the preferential embodiment of the invention when performing step d) of the method for measuring the distance between two points in accordance with the invention.

FIG. 5 is a schematic view of a representation of step e) of the method for measuring the distance between two points in accordance with the invention.

DETAILED DESCRIPTION OF THE INVENTION

The objective of the present application is a telemetry system 10 and a method for measuring the distance between a first point C1 in space and a second point C2 in space implemented using such a telemetry system 10.

The telemetry system 10 comprises a spatial reference device 20 comprising a first reference point O and at least two referential radio transceivers 21, 22, 23, 24, that is, a first referential radio transceiver 21 and a second referential radio transceiver 22, and a telemetry means 30 provided with a second reference point T, at least one positioning radio transceiver 32 and at least one telemeter 34. The spatial reference device 20 is shown in FIG. 1 and the telemetry means 30 is shown in FIG. 2.

The spatial reference device 20 may comprise a support in the form of a tripod.

The telemetry means 30 may comprise a housing 38. The housing 38 can integrate the positioning radio transceiver 32 and the telemeter 34. The telemetry means 30 may further comprise a display means 36 for a user, such as an OLED screen. The display means 36 allows a calculation result such as the distance between the first point C1 and the second point C2 to be displayed to the user.

The telemeter 34 may be a laser telemeter. The two points C1, C2 can be pointed at successively using the telemeter, for example by emitting a laser beam from the telemeter 34 in the direction of point C1, C2.

The telemetry means 30 and the referential radio transceivers 21, 22, 23, 24 may each be equipped with a processing unit, a memory and a power source such as a battery.

The battery may be a lithium-ion battery, preferably a lithium-ion polymer battery.

The telemetry means 30 may be provided with a gyroscope. The gyroscope is used to determine the orientation of the telemetry means 30 relative to the horizontal. The gyroscope may be integrated into the housing 38. The relative position of the gyroscope and of the first reference point O may be fixed. The relative position of the gyroscope and of the first reference point O may be known. The gyroscope may be a six-degrees-of-freedom gyroscope.

Alternatively, the spatial reference device 20 may comprise a camera and the telemetry means 30 may be provided with at least one visual reference, preferably at least two visual references. The visual references are visible on the exterior of the telemetry means 30. The visual references may for example be arranged on the housing 38. The orientation of the telemetry means 30 may be determined by capturing an image of the telemetry means 30 in which at least one of the visual references, preferably at least two of the visual references, is visible, and by performing an analysis of the references in the captured image. In this way, the position of the references relative to the camera can be determined, allowing the orientation of the telemetry means 30 in space to be calculated. The references may be passive reflective markers or take the form of two-dimensional optical markers.

According to another alternative, the telemetry means 30 may be provided with an additional positioning radio transceiver. The positioning radio transceiver 32 and the additional positioning radio transceiver are used to determine the orientation of the telemetry means 30 relative to the spatial reference device 20 and/or relative to the first reference point O.

The telemetry means 30 may further be provided with an accelerometer.

The spatial reference device 20 may also be provided with a gyroscope to determine the position of the referential radio transceivers 21, 22, 23, 24 relative to the horizontal.

The first reference point O is a point in space with Cartesian coordinates Xo, Yo, Zo. The position of each referential radio transceiver 21, 22, 23, 24 relative to the first reference point O is known. The second reference point T may be a point located on one of the sides of the housing 38 of the telemetry means 30.

According to one possibility, the spatial reference device 20 may further comprise a third referential radio transceiver 23. Thus, by determining the distance between the positioning radio transceiver 32 and each referential radio transceiver 21, 22, 23, 24, the relative position between the positioning radio transceiver 32 and the spatial reference device 20 can be calculated.

According to one possibility, the spatial reference device 20 may further comprise a fourth referential radio transceiver 24. The fourth referential radio transceiver 24 adds redundancy, resulting in an overdetermined equation system for determining the relative position between the positioning radio transceiver 32 and the spatial reference device 20.

In a preferential alternative, the first referential radio transceiver 21, the second referential radio transceiver 22, the third referential radio transceiver 23 and the positioning radio transceiver 32 may each feature a clock. The clock may be an integral part of the processing unit of the referential radio transceiver 21, 22, 23, 24.

The referential radio transceivers 21, 22, 23, 24 model a reference for Cartesian coordinates Xo, Yo, Zo.

According to one possibility, the first referential radio transceiver 21 and/or the second referential radio transceiver 22 and/or the third referential radio transceiver 23 and/or the positioning radio transceiver 32 is/are ultra-wideband transceiver(s).

Ultra-wideband is a radio modulation technique which is based on the transmission of pulses of very short duration, often less than a nanosecond, and over a wide frequency spectrum. The bandwidth can thus reach very high values. Typically, ultra-wideband has a bandwidth to center frequency ratio of at least 20%, or a bandwidth of 250 MHz or more. The use of ultra-wideband allows precise determination of the relative position between the positioning radio transceiver 32 and the spatial reference device 20.

The telemetry system 10 according to the present application allows a measurement to be taken between two points C1, C2 by pointing the latter successively at the two points C1, C2 in space by means of the telemeter 34. Unlike a conventional telemeter which requires the apparatus to be positioned at the initial point of the distance to be measured, the telemetry system 10 according to the present application will have a fixed reference point O.

The method according to the present application comprises the following steps:

- a) providing a spatial reference device 20 comprising a first reference point O and at least two referential radio transceivers 21, 22, 23, 24, that is, a first referential radio transceiver 21 and a second referential radio transceiver 22, a telemetry means 30 provided with a second reference point T, at least one positioning radio transceiver 32 and at least one telemeter 34;
- b) positioning the spatial reference device 20 in space;
- c) determining the relative position between the first reference point O and the first point C1
  - i. by positioning the telemetry means 30 in space,
  - ii. by determining the distance between the second reference point T of the telemetry means 30 and the first point C1 using the telemeter 34,
  - iii. by determining the relative position between the first reference point O of the spatial reference device 20 and the second reference point T of the telemetry means 30 from at least one radio signal transmitted between the referential radio transceivers 21, 22, 23, 24 and the positioning radio transceiver 32,
  - iv. by determining the orientation of the telemetry means 30 in space,
  - v. by calculating the relative position between the second reference point T and the first point C1 from the distance between the second reference point T and the first point C1, the relative position between the spatial reference device 20 and the second reference point T and the orientation of the telemetry means 30 in space,
- d) determining the relative position between the first reference point O and the second point C2
  - i. by positioning the telemetry means 30 in space,
  - ii. by determining the distance between the second reference point T of the telemetry means 30 and the second point C2 using the telemeter 34,
  - iii. by determining the relative position between the first reference point O of the spatial reference device 20 and the second reference point T of the telemetry means 30 from at least one radio signal transmitted between the referential radio transceivers 21, 22, 23, 24 and the positioning radio transceiver 32,
  - iv. by determining the orientation of the telemetry means 30 in space,
  - v. by calculating the relative position between the second reference point T and the second point C2 from the distance between the second reference point T and the second point C2, the relative position between the spatial reference device 20 and the second reference point T and the orientation of the telemetry means 30 in space,
- e) calculating the distance between the first point C1 and the second point C2 from the relative position between the reference point and the first point C1 and the relative position between the reference point and the second point C2.

In steps c) .iv and d) .iv, the orientation of the telemetry means 30 in space can be determined using the gyroscope of the telemetry means 30.

The determination of the relative position between the first reference point O of the spatial reference device 20 and the second reference point T of the telemetry means 30 in steps c) .iii and d) .iii can be carried out using separate methods.

A first method for determining the relative position between the first reference point O and the second reference point T is based on bidirectional communication between the referential radio transceivers 21, 22, 23, 24 and the positioning radio transceiver 32. During communication, all these radio transceivers 21, 22, 23, 24, 32 measure the time taken to receive the data (Time of Flight) of the radio signal between them. Multiplying the round trip time of the signal by the speed of light, then dividing it by 2, gives the actual distance between the spatial reference device 20 and the telemetry means 30 using this method. On this basis, it is possible to obtain a 2D or even 3D location by measuring the distance between the referential radio transceivers 21, 22, 23, 24 and the positioning radio transceiver 32.

According to this first method, in steps c) .iii and d) .iii, the relative position between the first reference point O and the second reference point T is calculated:

- by transmitting, from the positioning radio transceiver 32, a first radio request signal to the first referential transceiver 21 and a second radio request signal to the second referential transceiver 22,
- by transmitting, from the first referential transceiver 21, a first radio response signal to the positioning radio transceiver 32 after reception of the first radio request signal, and by transmitting, from the second referential transceiver 22, a second radio response signal to the positioning radio transceiver 32 after reception of the second radio request signal,
- by receiving the first radio response signal and the second radio response signal at the positioning radio transceiver 32,
- by determining a first response time elapsed between transmission of the first radio request signal and reception of the first radio response signal at the positioning radio transceiver 32,
- by determining a second response time elapsed between transmission of the second radio request signal and reception of the second radio response signal at the positioning radio transceiver 32,
- by determining a first angle between the first radio response signal in connection with the positioning radio transceiver 32 and the second radio response signal in connection with the positioning radio transceiver 32, and
- by calculating the relative position between the first reference point O and the second reference point T from the first response time, the second response time and the first angle.

According to a variant of this first method, in steps c) .iii and d). iii, the relative position between the first reference point O and the second reference point T is calculated:

- by transmitting, from the positioning radio transceiver 32, a first radio request signal to the first referential transceiver 21, a second radio request signal to the second referential transceiver 22 and a third radio request signal to the third referential transceiver 23,
- by transmitting, from the first referential transceiver 21, a first radio response signal to the positioning radio transceiver 32 after reception of the first radio request signal, by transmitting, from the second referential transceiver 22, a second radio response signal to the positioning radio transceiver 32 after reception of the second radio request signal, and by transmitting, from the third referential transceiver 23, a third radio response signal to the positioning radio transceiver 32 after reception of the third radio request signal,
- by receiving the first radio response signal, the second radio response signal and the third radio response signal at the positioning radio transceiver 32,
- by determining a first response time elapsed between transmission of the first radio request signal and reception of the first radio response signal at the positioning radio transceiver 32,
- by determining a second response time elapsed between transmission of the second radio request signal and reception of the second radio response signal at the positioning radio transceiver 32,
- by determining a third response time elapsed between transmission of the third radio request signal and reception of the third radio response signal at the positioning radio transceiver 32, and
- by calculating the relative position between the first reference point O and the second reference point T from the first response time, the second response time and the third response time.

Alternatively, instead of sending a first radio request signal to the first referential transceiver 21, a second radio request signal to the second referential transceiver 22 and a third radio request signal to the third referential transceiver 23, a single signal can be transmitted to the first referential transceiver 21, the second referential transceiver 22 and the third referential transceiver 23, using a single radio signal broadcast to the referential transceivers 21, 22, 23, 24.

A second method for determining the relative position between the first reference point O and the second reference point T is based on a measurement of the difference in the date of reception of a signal or Phase Difference of Arrival (PDoA). This method involves combining the distance between two apparatuses with the angle difference between them. The combination of distance and angle is used to calculate the relative position.

According to this second method, in steps c) .iii and d) .iii, the relative position between the first reference point O and the second reference point T is calculated:

- by synchronizing each of the clocks of the referential radio transceivers 21, 22, 23, 24 and the positioning radio transceiver 32,
- by transmitting, from the positioning radio transceiver 32, a first radio request signal to the first referential transceiver 21, a second radio request signal to the second referential transceiver 22 and a third radio request signal to the third referential transceiver 23,
- by receiving the first radio request signal at the first referential radio transceiver 21 and by storing a first date of reception of the first radio request signal corresponding to the date indicated by the clock of the first referential radio transceiver 21 at the time of reception of the first radio request signal by the first referential radio transceiver 21,
- by receiving the second radio request signal at the second referential radio transceiver 22 and by storing a second date of reception of the second radio request signal corresponding to the date indicated by the clock of the second referential radio transceiver 22 at the time of reception of the second radio request signal by the second referential radio transceiver 22,
- by receiving the third radio request signal at the third referential radio transceiver 23 and by storing a third date of reception of the third radio request signal corresponding to the date indicated by the clock of the third referential radio transceiver 23 at the time of reception of the third radio request signal by the third referential radio transceiver 23, and
- by calculating the relative position between the first reference point O and the second reference point T from the first date, the second date and the third date.

According to one possibility, the radio signal and/or the first radio request signal and/or the first radio response signal and/or the second radio request signal and/or the second radio response signal and/or the third radio request signal and/or the third radio response signal is/are an/are ultra-wideband signal(s). According to a possible additional feature, in steps c) .iv and d) .iv, the orientation of the telemetry means 30 can be determined by determining the relative position between the first reference point O and the positioning radio receiver 32 as well as the relative position between the first reference point O and the additional positioning radio receiver. The steps of the method c) .iii and d) .iii for determining the relative position between the first reference point O of the spatial reference device 20 and the second reference point T of the telemetry means 30 also make it possible to determine the relative position between the first reference point O and the radio positioning receiver 32.

According to one possibility, the relative position between the first reference point O and the additional radio positioning receiver can be determined:

- by transmitting, from the additional positioning radio transceiver, a fourth radio request signal to the first referential transceiver 21 and a fifth radio request signal to the second referential transceiver 22,
- by transmitting, from the first referential transceiver 21, a fourth radio response signal to the additional positioning radio transceiver after reception of the fourth radio request signal, and by transmitting, from the second referential transceiver 22, a fifth radio response signal to the additional positioning radio transceiver after reception of the fifth radio request signal,
- by receiving the fourth radio response signal and the fifth radio response signal at the additional positioning radio transceiver,
- by determining a fourth response time elapsed between transmission of the fourth radio request signal and reception of the fourth radio response signal at the additional positioning radio transceiver,
- by determining a fifth response time elapsed between transmission of the fifth radio request signal and reception of the fifth radio response signal at the additional positioning radio transceiver,
- by determining a second angle between the fourth radio response signal in connection with the additional positioning radio transceiver and the fifth radio response signal in connection with the additional positioning radio transceiver, and
- by calculating the relative position between the first reference point O and the additional positioning radio transceiver from the fourth response time, the fifth response time and the second angle.

According to another possibility, the relative position between the first reference point O and the additional radio positioning receiver can be determined:

- by transmitting, from the additional positioning radio transceiver, a fourth radio request signal to the first referential transceiver 21, a fifth radio request signal to the second referential transceiver 22 and a sixth radio request signal to the third referential transceiver 23,
- by transmitting, from the first referential transceiver 21, a fourth radio response signal to the additional positioning radio transceiver after reception of the fourth radio request signal, by transmitting, from the second referential transceiver 22, a fifth radio response signal to the additional positioning radio transceiver after reception of the fifth radio request signal and by transmitting, from the third referential transceiver 23, a sixth radio response signal to the additional positioning radio transceiver after reception of the sixth radio request signal,
- by receiving the fourth radio response signal, the fifth radio response signal and the sixth radio response signal at the additional positioning radio transceiver,
- by determining a fourth response time elapsed between transmission of the fourth radio request signal and reception of the fourth radio response signal at the additional positioning radio transceiver,
- by determining a fifth response time elapsed between transmission of the fifth radio request signal and reception of the fifth radio response signal at the additional positioning radio transceiver,
- by determining a sixth response time elapsed between transmission of the sixth radio request signal and reception of the sixth radio response signal at the additional positioning radio transceiver, and
- by calculating the relative position between the first reference point O and the additional positioning radio transceiver from the fourth response time, the fifth response time and the sixth response time.

According to another possibility, the relative position between the first reference point O and the additional radio positioning receiver can be determined:

- by synchronizing each of the clocks of the referential radio transceivers 21, 22, 23, 24 and the positioning radio transceiver 32 with a clock of the additional positioning radio transceiver,
- by transmitting, from the additional positioning radio transceiver, a fourth radio request signal to the first referential transceiver 21, a fifth radio request signal to the second referential transceiver 22 and a sixth radio request signal to the third referential transceiver 23,
- by receiving the fourth radio request signal at the first referential radio transceiver 21 and by storing a fourth date of reception of the fourth radio request signal corresponding to the date indicated by the clock of the first referential radio transceiver 21 at the time of reception of the fourth radio request signal by the first referential radio transceiver 21,
- by receiving the fifth radio request signal at the second referential radio transceiver 22 and by storing a fifth date of reception of the fifth radio request signal corresponding to the date indicated by the clock of the second referential radio transceiver 22 at the time of reception of the fifth radio request signal by the second referential radio transceiver 22,
- by receiving the sixth radio request signal at the third referential radio transceiver 23 and by storing a sixth date of reception of the sixth radio request signal corresponding to the date indicated by the clock of the third referential radio transceiver 23 at the time of reception of the sixth radio request signal by the third referential radio transceiver 23, and
- by calculating the relative position between the first reference point O and the additional positioning transceiver from the fourth date, the fifth date and the sixth date.

The spatial reference device 20 presents the first reference point O of origin (Xo; Yo; Zo). The telemetry means 30 may be positioned and oriented in space according to reference point T (Xt; Yt; Zt). The distance from the telemeter 34 to the first point C1 allows the first point C1 (Xc1; Yc1; Zc1) to be positioned in space relative to the reference point O. The distance from the telemeter 34 to the second point C2 allows the second point C2 (Xc2; Yc2; Zc2) to be positioned in space relative to the reference point O. The distance between the two points C1 and C2 can then be calculated.

I claim:

1. A method for measuring the distance between a first point (C1) in space and a second point (C2) in space, comprising the following steps:

a) providing a spatial reference device (20) comprising a first reference point (O) and at least two referential radio transceivers (21, 22, 23, 24), that is, a first referential radio transceiver (21) and a second referential radio transceiver (22), a telemetry means (30) provided with a second reference point (T), at least one positioning radio transceiver (32) and at least one telemeter (34);

b) positioning the spatial reference device (20) in space;

c) determining the relative position between the first reference point (O) and the first point (C1)

i. by positioning the telemetry means (30) in space, ii. by determining the distance between the second reference point (T) of the telemetry means (30) and the first point (C1) using the telemeter (34), iii. by determining the relative position between the first reference point (O) of the spatial reference device (20) and the second reference point (T) of the telemetry means (30) from at least one radio signal transmitted between the referential radio transceivers (21, 22, 23, 24) and the positioning radio transceiver (32), iv. by determining the orientation of the telemetry means (30) in space, v. by calculating the relative position between the second reference point (T) and the first point (C1) from the distance between the second reference point (T) and the first point (C1), the relative position between the spatial reference device (20) and the second reference point (T) and the orientation of the telemetry means (30) in space, d) determining the relative position between the first reference point (O) and the second point (C2)

i. by positioning the telemetry means (30) in space, ii. by determining the distance between the second reference point (T) of the telemetry means (30) and the second point (C2) using the telemeter (34), iii. by determining the relative position between the first reference point (O) of the spatial reference device (20) and the second reference point (T) of the telemetry means (30) from at least one radio signal transmitted between the referential radio transceivers (21, 22, 23, 24) and the positioning radio transceiver (32), iv. by determining the orientation of the telemetry means (30) in space, v. by calculating the relative position between the second reference point (T) and the second point (C2) from the distance between the second reference point (T) and the second point (C2), the relative position between the spatial reference device (20) and the second reference point (T) and the orientation of the telemetry means (30) in space, e) calculating the distance between the first point (C1) and the second point (C2) from the relative position between the reference point and the first point (C1) and the relative position between the reference point and the second point (C2).

2. The method, according to claim 1 the telemetry means (30) being provided with a gyroscope, the method characterized in that, in steps c) .iv and d) .iv, the orientation of the telemetry means (30) in space is determined using the gyroscope.

3. The method, according to claim 1, wherein, in steps c) .iii and d) .iii, the relative position between the first reference point (O) and the second reference point (T) is calculated by the following steps:

transmitting, from the positioning radio transceiver (32), a first radio request signal to the first referential transceiver (21) and a second radio request signal to the second referential transceiver (22), transmitting, from the first referential transceiver (21), a first radio response signal to the positioning radio transceiver (32) after reception of the first radio request signal, and by transmitting, from the second referential transceiver (22), a second radio response signal to the positioning radio transceiver (32) after reception of the second radio request signal, receiving the first radio response signal and the second radio response signal at the positioning radio transceiver (32), determining a first response time elapsed between transmission of the first radio request signal and reception of the first radio response signal at the positioning radio transceiver (32), determining a second response time elapsed between transmission of the second radio request signal and reception of the second radio response signal at the positioning radio transceiver (32), determining a first angle between the first radio response signal in connection with the positioning radio transceiver (32) and the second radio response signal in connection with the positioning radio transceiver (32), and calculating the relative position between the first reference point (O) and the second reference point (T) from the first response time, the second response time and the first angle.

4. The method, according to claim 1, wherein the spatial reference device (20) is further comprised of a third referential radio transceiver (23), and wherein the method in steps c) .iii and d) .iii, the relative position between the first reference point (O) and the second reference point (T) is calculated by the following steps:

transmitting, from the positioning radio transceiver (32), a first radio request signal to the first referential transceiver (21), a second radio request signal to the second referential transceiver (22) and a third radio request signal to the third referential transceiver (23), transmitting, from the first referential transceiver (21), a first radio response signal to the positioning radio transceiver (32) after reception of the first radio request signal, by transmitting, from the second referential transceiver (22), a second radio response signal to the positioning radio transceiver (32) after reception of the second radio request signal, and by transmitting, from the third referential transceiver (23), a third radio response signal to the positioning radio transceiver (32) after reception of the third radio request signal, receiving the first radio response signal, the second radio response signal and the third radio response signal at the positioning radio transceiver (32), determining a first response time elapsed between transmission of the first radio request signal and reception of the first radio response signal at the positioning radio transceiver (32), determining a second response time elapsed between transmission of the second radio request signal and reception of the second radio response signal at the positioning radio transceiver (32), determining a third response time elapsed between transmission of the third radio request signal and reception of the third radio response signal at the positioning radio transceiver (32), and calculating the relative position between the first reference point (O) and the second reference point (T) from the first response time, the second response time and the third response time.

5. The method, according to claim 1, wherein the spatial reference device (20) further comprises a third referential radio transceiver (23), wherein the first referential radio transceiver (21), the second referential radio transceiver (22), the third referential radio transceiver (23) and the positioning radio transceiver (32) each have a clock, and wherein, in steps c) .iii and d) .iii, the relative position between the first reference point (O) and the second reference point (T) is calculated by the following steps:

synchronizing each of the clocks of the referential radio transceivers (21, 22, 23, 24) and the positioning radio transceiver (32), transmitting, from the positioning radio transceiver (32), a first radio request signal to the first referential transceiver (21), a second radio request signal to the second referential transceiver (22) and a third radio request signal to the third referential transceiver (23), receiving the first radio request signal at the first referential radio transceiver (21) and by storing a first date of reception of the first radio request signal corresponding to the date indicated by the clock of the first referential radio transceiver (21) at the time of reception of the first radio request signal by the first referential radio transceiver (21), receiving the second radio request signal at the second referential radio transceiver (22) and by storing a second date of reception of the second radio request signal corresponding to the date indicated by the clock of the second referential radio transceiver (22) at the time of reception of the second radio request signal by the second referential radio transceiver (22), receiving the third radio request signal at the third referential radio transceiver (23) and by storing a third date of reception of the third radio request signal corresponding to the date indicated by the clock of the third referential radio transceiver (23) at the time of reception of the third radio request signal by the third referential radio transceiver (23), and calculating the relative position between the first reference point (O) and the second reference point (T) from the first date, the second date and the third date.

6. The method, according to claim 1, wherein the radio signal and/or the first radio request signal and/or the first radio response signal and/or the second radio request signal and/or the second radio response signal and/or the third radio request signal and/or the third radio response signal is/are (an) ultra-wideband signal(s).

7. A telemetry system for implementing the method according to claim 1, comprising:

a spatial reference device (20) comprising a first reference point (O) and at least two referential radio transceivers (21, 22, 23, 24), that is, a first referential radio transceiver (21) and a second referential radio transceiver (22), and;

a telemetry means (30) provided with a second reference point (T), at least one positioning radio transceiver (32) and at least one telemeter (34).

8. The telemetry system, according to claim 7, wherein the telemetry means (30) is provided with a gyroscope.

9. The telemetry system, according to claim 7, wherein the spatial reference device (20) further comprises a third referential radio transceiver (23).

10. The telemetry system, according to claim 9, wherein the first referential radio transceiver (21), the second referential radio transceiver (22), the third referential radio transceiver (23) and the positioning radio transceiver (32) each have a clock.

11. The telemetry system, according to claim 7, wherein the first referential radio transceiver (21) and/or the second referential radio transceiver (22) and/or the third referential radio transceiver (23) and/or the positioning radio transceiver (32) is/are (an) ultra-wideband transceiver(s).

* * * * *